US006859878B1

(12) United States Patent
Kerr et al.

(10) Patent No.: US 6,859,878 B1
(45) Date of Patent: Feb. 22, 2005

(54) UNIVERSAL USERID AND PASSWORD MANAGEMENT FOR INTERNET CONNECTED DEVICES

(75) Inventors: David Andrews Kerr, Austin, TX (US); David Medina, Danbury, CT (US); Mark A. Peloquin, Austin, TX (US); Raymond J. Venditti, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/428,566

(22) Filed: Oct. 28, 1999

(51) Int. Cl.[7] .................................................. H04L 9/00
(52) U.S. Cl. ........................ 713/183; 380/241; 380/278; 713/184
(58) Field of Search ................................ 380/241, 278; 713/183, 184

(56) References Cited

U.S. PATENT DOCUMENTS

| | | | |
|---|---|---|---|
| 5,734,718 A | * | 3/1998 | Prafullchandra ............... 380/4 |
| 5,812,764 A | | 9/1998 | Heinz, Sr. .............. 395/188.01 |
| 5,862,323 A | | 1/1999 | Blakley, III et al. .... 395/188.01 |
| 5,889,860 A | | 3/1999 | Eller et al. ...................... 380/4 |
| 5,909,671 A | | 6/1999 | Byford et al. ................. 705/26 |
| 6,243,816 B1 | * | 6/2001 | Fang et al. .................. 713/202 |

FOREIGN PATENT DOCUMENTS

GB        2329244        10/2000

OTHER PUBLICATIONS

W. Richard Stevens. TCP/IP Illustrated vol. 1, Addison–Wesley Publishing Company, Apr. 2000.*

* cited by examiner

Primary Examiner—Christine T. Tu
Assistant Examiner—Todd Jack
(74) Attorney, Agent, or Firm—Marilyn Smith Dawkins; Dillon & Yudell LLP

(57) ABSTRACT

An improved system, method, and computer program product is provided to manage userid/password combinations by utilizing a universally accessible Internet location. This site stores and manages an encrypted database containing the customers multiple userid and password combinations, and also acts as the repository and distribution center for the software used to access and manage the database by the customer. In one embodiment, these applications are designed to work seamlessly with the Internet connection-software (e.g. a set of buttons on a browsers tool bar). Encryption is used on both the client and/or server side to ensure security and integrity.

22 Claims, 3 Drawing Sheets

UNIVERSAL USERID AND PASSWORD MANAGEMENT FOR INTERNET CONNECTED DEVICES

BACKGROUND OF THE INVENTION

1. Technical Field

The present-invention generally relates to computer security and in particular to security management on distributed computer systems. Still more particularly, the present invention relates to password management for internet services.

2. Description of the Related Art

The explosive growth of the Internet has created a problem in password management. As more and more web sites which require some form of user authentication appear on the Internet, the problem facing users in managing their userids and passwords is becoming increasingly difficult.

Further, as many web sites are being visited by an increasingly-large number of users it is becoming increasingly difficult for a typical user to acquire a userid of choice. The user is normally forced to create a particular variant of his preferred userid (e.g. bob003), or is assigned some userid by the web site itself.

Many web sites also have their own security policies and requirements. For example, a userid and/or; password may have to be a minimum length and may require or forbid certain content. The web site may also force you to change your password on a regular basis, and may also prevent you from using certain aspects of your previous passwords.

Therefore, many Internet-users are forced to manage dozens of userids and passwords each potentially having different requirements. These userids and password combinations are difficult to remember or are not very secure. Many users attempt to resolve this by creating lists of userids and passwords so they will not be forgotten.

This problem is further complicated by the ubiquitous nature of Internet access. As a user goes from one terminal to another he currently has no secure way to access his userids and passwords (e.g. work, home, other). For example, while a user might store a list of userids and passwords on his office computer system, this list would be unavailable when the user is working on another computer system.

SUMMARY OF THE INVENTION

It is therefore one object of the present invention to provide improved computer security.

It is another object of the present invention to provide improved security management on distributed computer systems.

It is yet another object of the present invention'to provide improved password management for internet services.

The foregoing objects are achieved as is now described.

It would therefore be desirable to provide an internet accessible database-which allows a user to store userids and passwords for various other internet sites. It would be a further advantage to provide an integration of the database with other internet sites, so that the user can connect with those sites without having to remember specific userids and passwords for each of the sites.

According to the preferred embodiment, an improved system, method, and program is provided to manage userid/ password combinations by utilizing a universally accessible Internet location. This site stores and manages an encrypted database containing the customers multiple userid and password combinations, and also acts as the repository and distribution center for the software used to access and manage the database by the customer. In one embodiment, these applications are designed to work seamlessly with the Internet connection software (e.g. a set of buttons on a browsers tool bar). Encryption is used on both the client and/or server side to ensure security and integrity.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
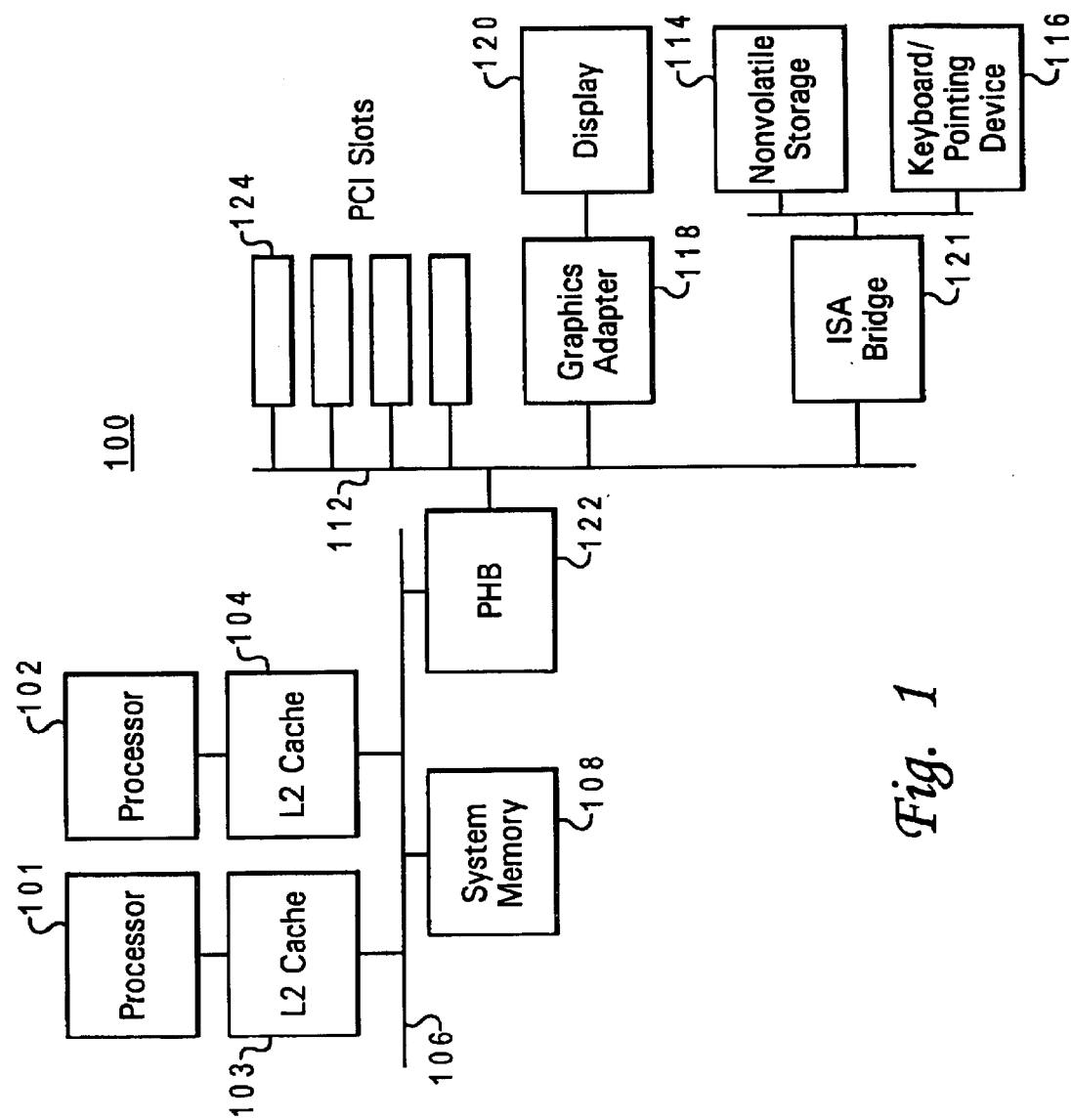
FIG. 1 depicts a block diagram of a data processing system in which a preferred-embodiment of the present invention may be implemented.

With reference now to the figures, and in particular with reference to FIG. 1, a block-diagram of a data processing system in which a preferred embodiment of the present invention may be implemented is depicted. Data processing system 100 may be, for example, one of the computers available from International Business Machines Corporation of Armonk, N.Y. Data processing system 100 includes processors 101 and 102, which in the exemplary embodiment are-each connected to level two (L2) caches 103 and 104, respectively, which are connected in turn to a system bus 106.

Also connected to system bus 106 is system memory 108 and Primary Host Bridge (PHB) 122. PHB 122 couples I/O bus 112 to system bus 106, relaying and/or transforming data transactions from one bus to the other. In the exemplary embodiment, data processing system 100 includes graphics adapter 118 connected to I/O bus 112, receiving user interface information for display 120. Peripheral devices such as nonvolatile storage 114, which may be a hard disk drive, and keyboard/pointing device 116, which may include a conventional mouse, a trackball, or the like., are connected via an Industry Standard Architecture (ISA) bridge 121 to I/O bus 112. PHB 122 is also connected to PCI slots 124 via I/O bus 112.

The exemplary embodiment shown in FIG. 1 is provided solely for the purposes of explaining the invention and those skilled in the art will recognize that numerous variations are possible, both in form and function. For instance, data processing system 100 might also include a compact disk read-only memory (CD-ROM) or digital videodisk (DVD) drive, a sound card and audio speakers, and numerous other optional components. All such variations are believed to be-within the spirit and scope of the present invention. Data processing system 100 and the exemplary figures below are provided solely as examples for the purposes of explanation and are not intended to imply architectural limitations. In fact, this method and system can be easily adapted for use on any programmable computer system, or a network of systems, on which software applications can be executed.

According to the preferred embodiment, an improved system, method, and program is provided to manage userid/password combinations by utilizing a universally accessible Internet location. This site stores and manages an encrypted database or repository containing the customer's multiple userid and password combinations along with the corresponding website Uniform Resource Locators (URL), and also acts as the repository and distribution center for the software used to access and manage the database by the customer. Encryption is used on both the client and/or server side to ensure security and integrity.

Figure 2:
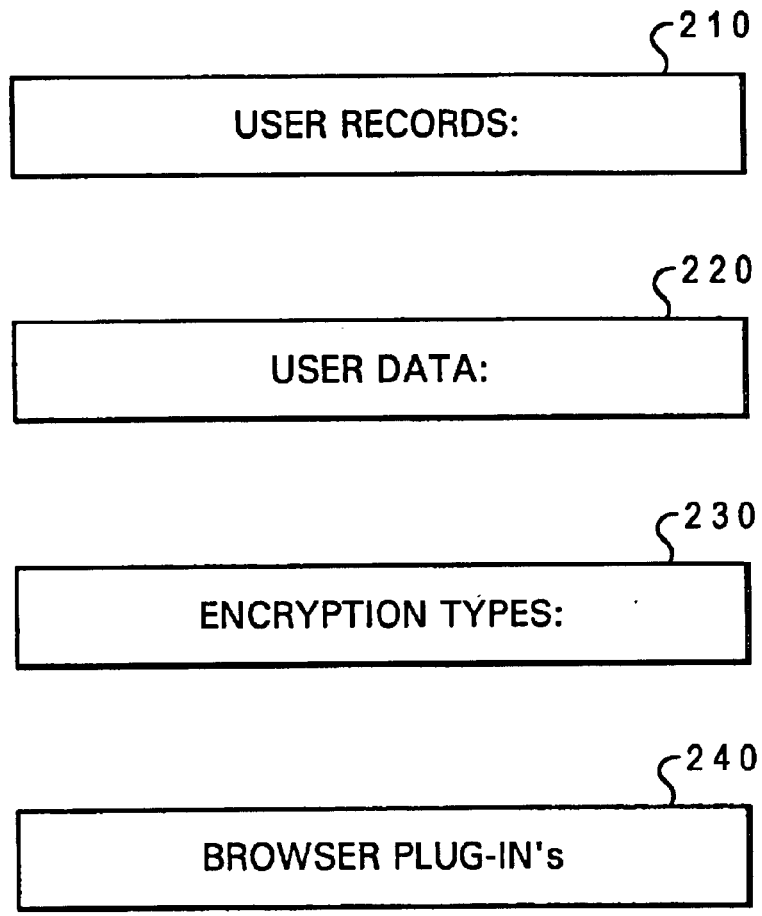
FIG. 2 is a block diagram of repository components in accordance with a preferred embodiment of the invention.

FIG. 2 shows a block diagram of data components stored in the repository. User Records 210 include the userids and passwords that users will use to access the repository itself, as well as a pointer into the User Data for each user and a record of the encryption type used by each user. The User Data 220 includes a database, for each user, of the URLs the user has accessed along with the corresponding userids passwords, and login methods. The Encryption-Types 230 includes the types of encryption supported by the repository, as well as corresponding encryption/decryption codes. The Browser Plug-ins 240 includes the software plug-in for many different internet browser systems, to allow them to use the described internet repository system.

All data stored on the Internet repository site is encrypted. The encryption and decryption of this data only happens on the customer's machine, according to one of many known encryption mechanisms. The repository is accessed by sending a single authentication token, which may be simply a "master" userid/password combination, from the user's machine to the repository, using either specialized software or a common internet browser software. Upon access, some or all of the user's information is returned.

After the repository returns the user data, it is processed according to one-or more of the following methods, each of which is a different embodiment of the present invention.

In its most basic form, a list of the user's data is presented to the user (e.g. URL/userid/password). The user can then see the userid and password corresponding to each URL. The URL's can be presented as a direct hyperlink, if displayed in a browser, or can be passed to or manually entered into an internet browser for easy access. In the preferred embodiment, the password will only be displayed in clear text at the user's option, so that it can be manually entered if necessary. When the user information is automatically entered into a site, however, the preferred embodiment will not show the password in clear text.

In another embodiment, the user's information may be stored into a "clipboard" on the local system for use in pasting into a web site's authentication panels. In this case, the user has only to use the "paste" function to insert the information into the userid and password (or other) fields of the target web site.

According to the preferred embodiment, however, the information is automatically sent to the URL selected by the user. This embodiment is preferred because it abstracts the user's authentication data to a particular site by creating automatic authentication responses to recognized URL's. This approach is particularly useful with websites designed to accept a call with a common format for delivery of the user authentication data.

Using any of the above embodiments, a user is able to have access to any number of web sites by simply knowing a single authentication token (e.g. userid/password) for the repository system.

Other features of a computer program product according to the preferred embodiment will include the following:

Random passwords can be created based on a set of criteria. Because the passwords will be easily looked up from the repository, they no longer must be easy for the user to remember, and more secure, random passwords can be used.

The user's encrypted database is cached in the user's machine's memory on the local system to reduce the amount of network traffic with the repository. The system can be customizable to determine the persistence of a valid session on public terminals (e.g. automatic idle time logoffs, requirement of an authentication token on each log on attempt, etc.)

Figure 3:
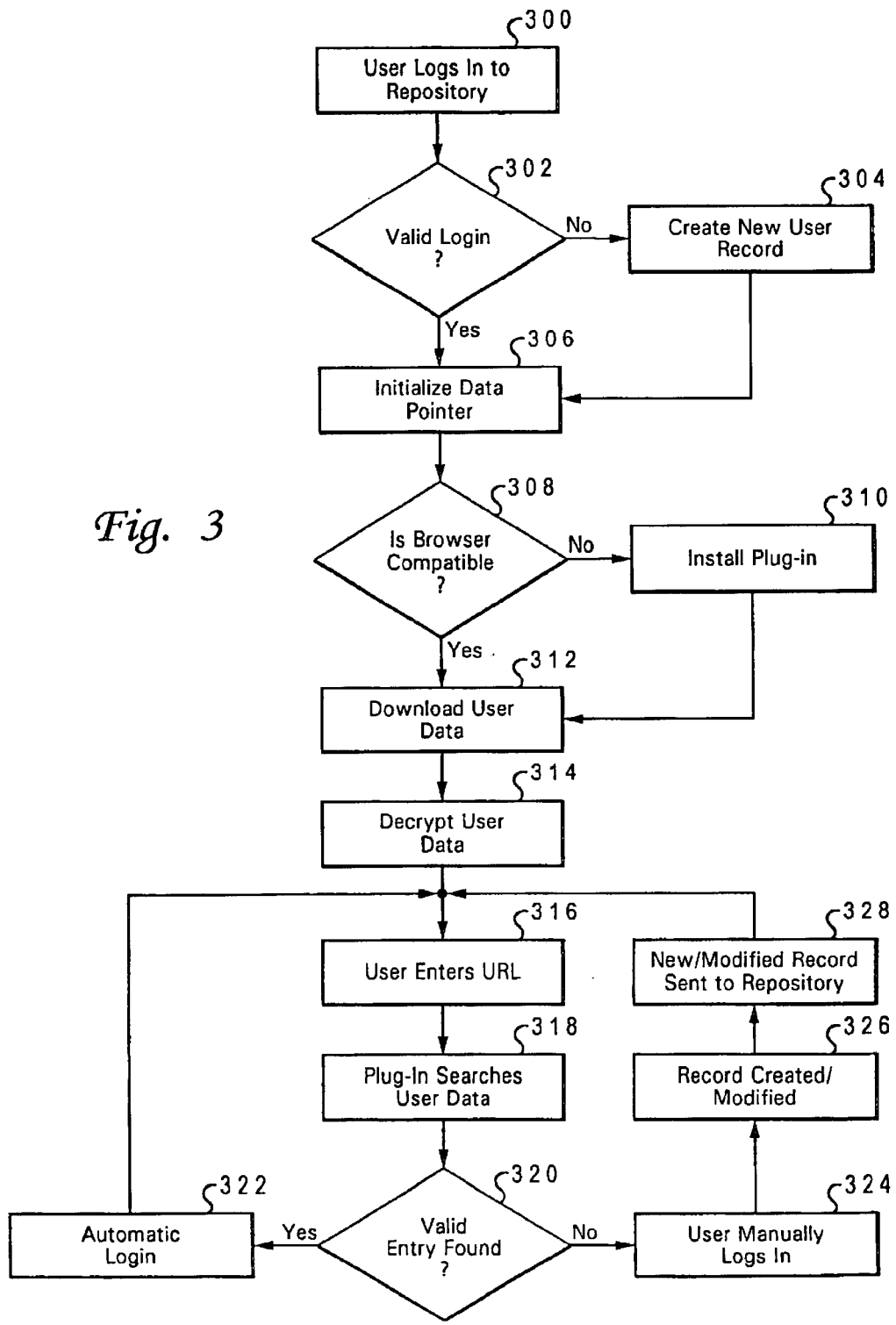
FIG. 3 is a flowchart of a process according to the preferred embodiment.

A flowchart of a process in accordance with the preferred embodiment is shown in FIG. 3. When the user accesses the internet repository, using a standard browser, he is first prompted for a userid and password (step 300), which are checked against the user database (step 302). If the userid is not recognized, the user is given the opportunity to create a new User Record (step 304). The userid and password entered are stored in the new User Record, and the user is prompted for the type of encryption desired, which can be any of those common in the industry. At this point, the user data pointer, from either a recognized user or a newly created user, is initialized (step 306).

A flowchart of a process in accordance with the preferred embodiment is shown in FIG. 3. When the user accesses the internet repository, using a standard browse, he is first prompted for a userid and password (step 300), which is checked against the user database (step 302). If the userid is not recognized, the user is given the opportunity to create a new User Record (step 304). The userid and password entered are stored in the new User Record, and the user is prompted for the type of encryption desired, which can be any of those common in the industry. At this point, the user data pointer, from either a recognized user or a newly created user, is initialized (step 306).

Next, the user's browser is checked to ensure that it is capable of decrypting the repository data (step 308). In the preferred-embodiment, this is done by way of an installed browser plug-in. If the plug-in is not present on the user's system, the repository will download and install the plug-in (310).

Next, the User Data for that user is downloaded by the plug-in, in encrypted-form, from the repository to the user's machine (step 312). The plug-in decrypts the User Data and stores it in memory (step 314). Note that, in the preferred embodiment, the decrypted User Data is never stored to a hard drive or other non-volatile storage, for security purposes, although it can be so stored in less preferred embodiments.

Hereafter, whenever the user accesses a new-Uniform. Resource Locator address (URL) (step 316), the plug-in automatically searches for a record in the User Data that corresponds to that URL (step 318). If the URL is found, the plug-in validates the corresponding User Data (step 320) then uses the information in the User Data to automatically login to that URL based on the Log-In data-stored in the User Data (step 322). If an automatic login is unsupported by that particular URL site, the login data from the User Data will be stored into a "clipboard" memory on the user's system for easy access.

If the URL is not found in the User Data, then a new record is created. After the user manually logs into the site (step 324), the plug-in will create a new record in the User Data which includes all the information needed to login to that site (step 326). This information will typically include the URL, the Userid corresponding to that URL; the password corresponding to that Userid, and the user login method. The plug-in will then transmit an encrypted version of this updated version of User Data containing the new record to the repository to be added to the User Data (step 328).

If the URL is found in the User Data, but some part of that record is invalid or expired, then the user must login to the site manually (step 324). After the user has done so, the plug in will update the User Data by storing the Userid, password, and login method for that URL (step 326). The plug-in-will then transmit an encrypted version of this updated version of the User Data containing the modified record to the repository to be added to the User Data (step 328).

The user will therefore be able to quickly and easily login to any site the repository, while the plug-in in waits to check the next URL entered by the user. When the user closes the browser, logs off his computer system, or turns off his-computer system, the User Data is cleared from the computer system memory.

It is important to note that while the present invention has been described in the context of a fully functional data processing system and/or network, those skilled in the art will appreciate that the mechanism of; the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. In a data processing system connected to a wide area network, a method for user password management, comprising:

accessing a first remote system from a first local system, said first remote system being universally accessible via the wide area network and containing a database of user files that each contain a list of login authentication credentials for a specific user identified by a unique authentication token associated with that file, wherein said login authentication credentials enables the specific user to access one or more user accounts hosted at other remote systems without requiring knowledge of the login authentication credential for the user accounts at the other remote systems;

sending the unique authentication token of the user to the first remote system from the first local system;

when said unique authentication token is verified at said first remote system, receiving, at the first local system, (1) a set of user data from the remote system including the list of login authentication credential and (2) a software application that self-installs on the first local system and initiates a plurality of functions that enable set-up of the list of loan authentication credential and access to said one or more user accounts via said loin authentication credential;

accessing one or more of the other remote systems from the first local system; and choosing a corresponding one of said login authentication credential to login to a user account at each of said one or more of the remote systems, wherein access to the user account on said other remote system is provided to said user utilizing login credential information from within said list received from said first remote system.

2. The method of claim 1, wherein the first and second remote systems are Internet-accessible servers and the first local system is one many local systems that may be utilized to access the first remote system and retrieve said list of login authentication credential by entering a universal resource locator (URL) into a web browser application executing on a local system.

3. The method of claim 1, wherein said software application is maintained by the first remote system as a downloadable software application and provides a plurality of functions including: (1) enabling dynamic login to said one or more other remote systems; (2) encrypting and decrypting said file of login authentication credential; (3) updating said file with user-modifications to existing login authentication credential and newly established login authentication credential; (4) randomly generating unique login authentication credential for new user accounts and storing the randomly generated login authentication credential; and (5) deleting said file from memory on said local system based on occurrence of pre-established conditions.

4. The method of claim 1, wherein the set of user data is transmitted between the first remote system and the local system in an encrypted form, and said method further comprises decrypting said set of user data on the local system to enable user viewing of login authentication credential for accessing the other remote systems.

5. The method of claim 1, wherein said login authentication credential includes at least a user ID and password, and the set of user data includes username, password, internet address, and login method data for one or more other remote systems accessible via the Internet.

6. The method of claim 1, wherein when the internet address of one of the other remote systems identified within the list is entered into the browser on the first local system, the login authentication credential is automatically populated into the login portal of the other remote system using login authentication credential associated with that internet address in the list.

7. An internet connected and universally accessible computer system, comprising:

a processor;

a non-volatile storage;

a database of user files, stored in the non-volatile storage, said user files each containing login credential data utilized by a user to access one or more user accounts respectively, located on one or more remote computer systems accessible to a user computer system via a wide area network such as the Internet;

wherein the database is accessible only by an authentication token that includes a unique user ID and password combination of the corresponding user;

means for receiving a request from a user computer system, said request including a verified authentication token;

means for sending a subset of the user data, including a specific user file of login credential data corresponding to the user authentication token, to the user computer system; and means for receiving, from the user computer system, a set of login credential data corresponding to the user authentication token and storing the set of login credential data as a part of user data in the non-volatile memory.

8. The computer system of claim 7, freer comprising:

an encryption utility that encrypts said user data prior to transmitting said data to said user computer system;

an exportable software utility that enables the user computer system to decrypt said user data at said user computer system; and means for exporting said software utility concurrent with said user data to said user computer system, wherein said software utility self installs on said user computer: system, decrypts said user data, and temporarily stores said user data within a temporary storage on said user computer system.

9. The computer system of claim 8, comprising:

means for receiving updates and modifications to said user data file from said user computer; and means for storing said updates and modifications within said user data.

10. The computer system of claim 7, further comprising:

means for creating and maintaining a repository of user-specific files that each contain encrypted user data, wherein said user data includes internet addresses for a plurality of remote web sites at which said user has a user account that requires authenticated login;

means for enabling individual user access to each user-specific file only when a user connects via a remote computer and said user provides a valid authentication token for that user-specific file; and means for transmitting to the remote computer a copy of said encrypted user data along with a management utility that enables said user to access other remote network sites identified within said user data utilizing a corresponding login credential associated with internet address of the remote site within the user data, wherein login credential of said user to any remote site identified within the user data is provided by said management utility.

11. The computer system of claim 7, further comprising:

means for creating said user data file of said user; and means for generating said authentication token for said user when said user data file is being created; and means for receiving modifications and updates by said user of both said user data file and said authentication token, wherein said user data file is modified at the remote computer following a download of said user data to said remote computer.

12. The computer system of claim 7, further comprising:

means for encrypting said user data file before transmitting said user data file to said remote computer.

13. The computer system of claim 7, wherein the user data includes, for each web site to which said user has established an authentication password, a username, password, internet address, and login program data.

14. In a local computer system, a computer program product for managing user access to remote computer systems, said program product comprising:

instruction means for dynamically decrypting a downloaded user file from a remote server, wherein said user file includes a list of remote web sites and access authentication credentials for login in to a pre-established user account at each of said remote web sites;

instruction means for enabling user access to said list at said local computer;

instruction means for enabling user updates and modification to said list;

instruction means for encrypting said list prior to exporting said list to a repository of said remote server, wherein said repository designed for storing multiple lists of multiple users and is accessible only via a unique, user-specific authentication token; and instruction means for exporting said list to the repository.

15. The computer program product of claim 14, further comprising:

instruction means for opening a sign-in portal on said local computer when said user enters a universal resource locator (URL) of one of said remote web sites in a browser application; and when said remote web site supports automatic login, instruction means for automatically populating the sign-in portal for the remote web sites utilizing a corresponding authentication credential from within said user file.

16. The computer program product of claim 14, wherein, when said list contains hyperlinks to said remote web sites, said program product further comprising:

instruction means for automatically opening a sign-in portal on said local computer when said user selects a name of one of said remote web sites within said list, wherein said name automatically populates the URL field of a browser application executing on said local computer; and when said remote web site supports automatic login, instruction means for automatically populating the sign-in portal for the remote web sites utilizing an authentication credential associated with the selected remote web site from within said user file.

17. The computer program product of claim 14, wherein each authentication credential includes at least a userid and password combination, and said instruction means further comprises:

instruction means for tracking updates and modifications to said userids and passwords at respective remote web sites during accesses by said user to said remote web site, said updates including updates of old user accounts and set up of new user accounts having new authentication parameters;

instruction means for dynamically storing said updates within the list and forwarding said updated in encrypted form when said list is returned to said remote server.

18. The computer program product of claim 14, further comprising:

instruction means for initiating a self self-installation on said local computer following an initial download of said computer program, wherein said self-installation includes storing said user file in volatile memory;

wherein said self-installing process modifies a browser application and provides (1) a set of user-selectable buttons that are displayed on a toolbar of said browser application; and (2) universal browser plug-ins for use by different configurations of internet browsers to enable access management to said remote web sites, data decryption and encryption, and storage of said user file within memory;

wherein further, said browser application is provided integrated userid and password combinations within a browse feature to enable a user access to a user-account at a remote web site by entering only a URL from the list of URLs, whereby the userid and password combination associated with that URL is automatically filled in the login portal of the remote web site.

19. The computer program product of claim 14, further comprising:

instruction means for automatically preventing access to said list following one of a number of pre-established occurrences, including; said local computer entering into sleep mode; and said local computer being inactive for a pre-set period of time, wherein subsequent access to said user data requires entry by the user of said authentication token; and instruction means for automatically deleting said user data from memory during a power off of said local computer, a log off of said local computer, or a closing of a browser utilized to access said remote web sites.

20. The computer program product of claim 14, further comprising:

instruction means for selectively hiding a password of a remote web site that supports said automatic login, wherein said password is displayed in clear text when a parameter is set by the user to enable display of the password.

21. The computer program product of claim 14, further comprising:

instruction means for storing said list of user authentication credentials within a clipboard memory; and instructions means for enabling the user to select one of said authentication credentials from said clipboard and directly paste the credential into a remote web site's login authentication portal.

22. The computer program product of claim 14, further comprising:

instruction means for randomly assigning passwords for accounts being created by the user; and instruction means for storing the randomly assigned passwords within the list, and providing the randomly assigned password to said user during subsequent access to said remote web site, wherein said user is not required to remember the randomly assigned password during a first or subsequent access to said remote web site.

* * * * *

UNITED STATES PATENT AND TRADEMARK OFFICE
CERTIFICATE OF CORRECTION

PATENT NO. : 6,859,878 B1  Page 1 of 1
DATED : February 22, 2005
INVENTOR(S) : Kerr et al.

It is certified that error appears in the above-identified patent and that said Letters Patent is hereby corrected as shown below:

Column 4,
Line 17, insert:
-- The embodiments described above allow multiple userids and passwords to be seamlessly combined into a secure single authentication token that allows a user to roam from machine to machine. This is a great improvement over current poassword management packages, which are restricted to a single machine by use of a persistent data which is maintained on a local storage device which is not universally accessible. The preferred embodiments improve on this in that the managed data and software is remotely and globally accessible from any client or machine. In other words, everything necessary to use this solution is remotely accessible via the repository. Nothing other than Internet access software and minimal browser functionality is required. --.
Line 30, delete the paragraph.

Column 6,
Line 3, delete "loan" and insert -- login --.
Line 4, delete "loin" and insert -- login --.

Column 7,
Line 10, delete "freer" and insert -- further --.

Signed and Sealed this

Twenty-first Day of March, 2006

JON W. DUDAS
*Director of the United States Patent and Trademark Office*